United States Patent [19]
Furrer

[11] Patent Number: 5,957,254
[45] Date of Patent: Sep. 28, 1999

[54] PROCESS AND APPARATUS FOR COUPLING ELASTIC AND RIGID CONTACT LINE SYSTEMS

[75] Inventor: Beat Furrer, Bern, Switzerland

[73] Assignee: Furrer & Frey A.G., Bern, Switzerland

[21] Appl. No.: 08/983,468

[22] PCT Filed: Dec. 12, 1996

[86] PCT No.: PCT/EP96/05580

§ 371 Date: Apr. 13, 1998

§ 102(e) Date: Apr. 13, 1998

[87] PCT Pub. No.: WO97/36764

PCT Pub. Date: Oct. 9, 1997

[30] Foreign Application Priority Data

Apr. 1, 1996 [CH] Switzerland .............................. 843/96

[51] Int. Cl.$^6$ ...................................................... B60M 1/00
[52] U.S. Cl. ............................................................ 191/40
[58] Field of Search ............................. 191/1 R, 9, 12 R, 191/14, 22 R, 33 R, 40, 41

[56] References Cited

U.S. PATENT DOCUMENTS

| | | |
|---|---|---|
| 886,475 | 5/1908 | Brunberg .................................. 191/14 |
| 918,761 | 4/1909 | Mayer ..................................... 191/33 R |
| 2,884,614 | 4/1959 | Taylor ..................................... 191/33 R |
| 3,985,211 | 10/1976 | Bommart .................................. 191/40 |
| 4,049,092 | 9/1977 | Lillard et al. ............................. 191/40 |
| 4,230,209 | 10/1980 | Ohura et al. .............................. 191/40 |

FOREIGN PATENT DOCUMENTS

| | | |
|---|---|---|
| 2470020 | 11/1979 | France . |
| 2201133 | 8/1988 | United Kingdom . |

*Primary Examiner*—Mark T. Le
*Attorney, Agent, or Firm*—Senniger, Powers, Leavitt & Roedel

[57] ABSTRACT

Method and apparatus for coupling a flexible contact line system and a rigid contact line system which support an overhead contact wire for providing electrical power to electrically driven vehicles. An elongate spring pole positioned in a transitional area between the rigid contact line system and the flexible contact line system supports the overhead contact wire. The spring pole has a mechanical rigidity which varies in the longitudinal direction.

12 Claims, 5 Drawing Sheets

PROCESS AND APPARATUS FOR COUPLING ELASTIC AND RIGID CONTACT LINE SYSTEMS

BACKGROUND OF THE INVENTION

The invention relates to a process and an apparatus for coupling elastic and rigid contact line systems. For supplying power to electrically driven vehicles, particularly rail vehicles, contact lines are located in the form of wire arrangements suspended above the rail, wherein these wire arrangements direct electrical energy to the electrically driven vehicles via current collectors. The overhead contact wires are in accordance with European standards and each overhead contact wire is suspended on a catenary wire by means of suspension wires, suspended at short intervals, wherein the support points are located on the catenary wire approximately 30–180 cm higher than the overhead contact wire. The vertical distance from the rail to the support points is called the system height. For economic reasons, the system height must have very small dimensions inside tunnels and in the case of superstructures. Furthermore, the overhead contact wires and the catenary wires are mechanically tensioned at 8–30 kN in order to allow sliding friction contact speeds of up to 500 km/hr via the current collectors. The necessary tensioning devices are complex arrangements that are difficult to assemble, particularly in underground stretches of tunnel, since they require additional space. Furthermore, the current collector presses upward on the overhead contact wire at 70–300 N, which requires more space. For these reasons, for sites with limited space, such as in tunnels or superstructures, rigid contact rails were introduced, thus lowering the system height in particular. However, the transition from the elastic contact line to the rigid contact rail, i.e., the coupling between the contact line in the form of a hanging wire arrangement and the rigid contact rail, presents problems. It is customary to guide the overhead contact wire of the contact lines as a suspended wire arrangement parallel to the rigid contact rail. This, however, makes passage at high speeds more difficult and increases wear on the current collector. Furthermore, there is a danger of the current collector becoming entangled between the overhead contact wires and pulling the same down, which will bring the operation to a standstill.

SUMMARY OF THE INVENTION

It is the task of the present invention to offer a process and an apparatus which remove the above-mentioned disadvantages and, particularly at a low cost, make possible a good coupling between an elastic contact line in the form of a suspended wire arrangement and a rigid contact rail on which the current collector can drive at high speeds, and which has minimal wear and a long service life expectancy.

The basic principle of the invention involves the series connection of the elastic contact line and the rigid contact rail. Specifically, in the longitudinal direction of the contact line system, an elastic transition area is created between the rigid contact rail and the flexible contact line in the form of a suspension wire. This elastic transition or coupling range is realized by means of a specially formed spring pole whose elasticity increases from its end on the rigid contact rail side to the end of the flexible contact line side. In this way, the coupling location between rigid and flexible contact line parts is distributed across a greater distance, whereby the flexural-type stress on the overhead contact wire, brought about as a result of the interaction between current collector and overhead contact wire, is distributed across a greater mechanical length and in this way is more effectively damped. The overhead contact wire is guided in series with respect to the rigid contact rail and the contact line in the form of a suspended wire arrangement, i.e., without lateral offset of the current-conducting path. Due to the elastic coupling, the risk of breaks occurring on the overhead contact wire due to metal fatigue is greatly reduced.

According to a further development of the invention, the spring pole has essentially the same cross-sectional profile as the rigid contact rail; however, in the longitudinal direction it has recesses that constantly vary the mechanical rigidity of the spring pole in its longitudinal direction.

The coupling of the spring pole with the rigid contact rail takes place by means of butt straps arranged in the interior of the profiles of the contact rail and spring pole and are provided with longitudinal ribs. In this way, the butt straps connect the spring pole with the contact rail system mechanically and electrically Preferably, the cross section of the butt straps has a conical or tapered form.

DESCRIPTION OF THE DRAWINGS

In the following text, the invention is explained in greater detail by means of the drawings, wherein.

BRIEF DESCRIPTION OF THE INVENTION

Figure 1:
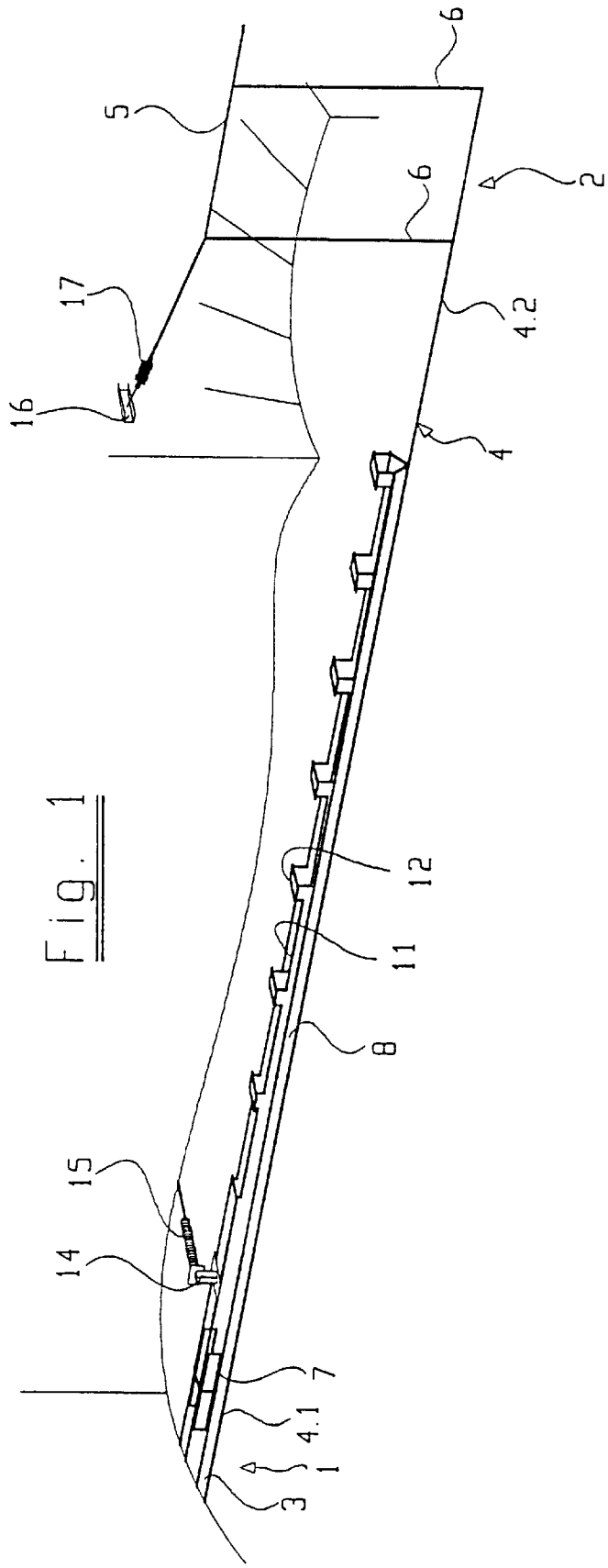
FIG. 1 shows an embodiment of a coupling arrangement.

In FIG. 1, a contact rail system (1) is shown, which consists of a rigid contact rail (3) and an overhead contact wire section (4.1), as well as an elastic contact line system (2) in the form of a suspended wire arrangement and a catenary wire (5), several suspension wires (6), and an overhead contact wire section (4.2). Altogether, the overhead contact wire is shown by (4). The section of the overhead contact wire (4) assigned to the rigid contact rail is shown by (4.1) and the section assigned to the flexible wire arrangement in the form of a suspended arrangement is shown by (4.2).

In a transitional or coupling area between the two overhead contact wire sections (4.1 and 4.2), an elastic spring pole (8) is arranged, which is mounted on the rigid contact rail (3) by means of butt straps (7) and by means of these butt straps (7) is mechanically and electrically connected with the contact rail (3). As is further clarified in connection with FIGS. 3 and 6, the overhead contact wire (4) is clamped into the profile of the spring pole and the contact rail, i.e., in such a way that it protrudes in the downward direction from the profile and in this way establishes the contact with the current collector of the vehicle. The overhead contact wire (4.1) is laid along the entire contact rail. In this way, the contact rail profile does not take over the function of the overhead contact wire. Instead, the latter maintains its function, thus creating the advantage wherein the current collectors can always pick up the current at the same medium, the overhead contact wire, which may, for example, consist of copper wire. Furthermore, there is the advantage wherein the overhead contact wire, as a wear-and-tear part, may simply be exchanged after being consumed and the base material, i.e., the contact rail, can maintain its original cross section and is not subject to wear and tear. In principle, the spring-pole (8) has the same cross-sectional profile as the contact rail. However, distributed along its length, it has several recesses (11) whose depth increases from the contact rail (3) towards thee suspended overhead contact wire (4.2), whereby the elasticity of the spring pole also increases in the same direction. In this way, between the recesses (11), of the complete profile remain standing has been changed elevated parts (12) of the complete profile remain standing at a substantially constant height parts (12) of the complete profile remain.

The contact rail (3) and the spring pole (8) are attached by means of mounting straps (14) and insulators (15) on support points, not shown. These support points are, for example, at a distance of 8 m with respect to each other. The attachment of the catenary wire (5) takes place in an example showing the entry into a tunnel by means of a holding part and an electrical insulator (17).

Figure 2:
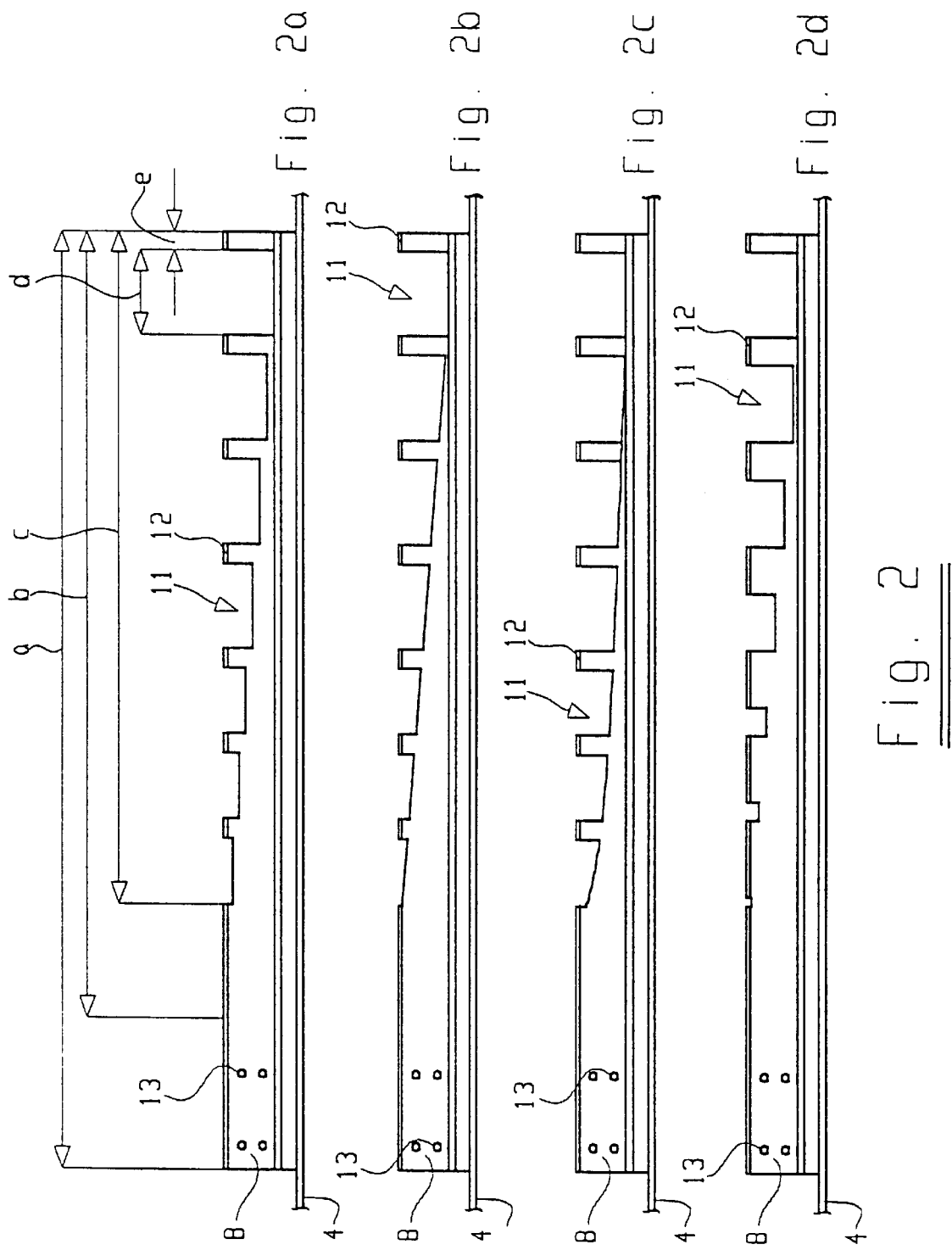
FIG. 2 shows different side views of the spring poles in accordance with several embodiments of the invention.

FIG. 2 shows various side views of the spring pole (8) into which the overhead contact wire (4) is placed and to which it is attached. The overhead contact wire (4) is series-connected, i.e., connected in an aligned and continuous manner with the spring pole, which prevents all drops in voltage and all disruptions at the current collector run. The spring pole (8) has in its longitudinal direction several recesses (11) between which sections (12) of the complete profile remain standing. In the example of FIG. 2a, the recesses (11) have increasing depth and, respectively, have an underside that is level and extends parallel to the overhead contact wire. In a specific example, designed for driving speeds of 140 km/hr, the overhead contact wire consists of electrolytic copper and has a diameter of 12.25 mm. The overhead contact wire tension is 12 kN. The overhead contact wire height is 4.85 m above the upper edge of the rail. The current collector pressure force lies near 70 N (static). The system height of the wire arrangement is 1.60 m and the vault height, i.e., the distance between the overhead contact wire and the apex of the tunnel, lies near 40 cm above the overhead contact wire height. In this example, (compare FIG. 2a) the entire length (a) of the spring pole amounts to 12 m. The distance (b) from the support point to the flexible end of the spring pole amounts to 9 m. The length (c) of the elastic area from the start of the first recess up to the free end of the spring pole (8) is 2.88 m. The length (d) of a recess is 0.42 m and the length (e) of the sections (12) left standing between the recesses is 6 cm. Altogether, six recesses (11) are provided. The distance from the free end of the spring pole to the tunnel opening lies near 3 m.

In the case of the embodiment of FIG. 2b, the underside of the recesses (11) extends diagonally along a straight line. With the embodiment of FIG. 2c, the underside of the recesses (11) extends along a curved line that, beginning at the rigid area of the spring pole, drops off more steeply and becomes flatter towards the end. Due to the course of this curvature line, the elastic quality in the longitudinal direction of the spring pole may be varied in a specific way.

With the embodiment of FIG. 2d, the recesses (11) increase in width from the rigid end towards the flexible end and simultaneously, in accordance with FIG. 2a, also have an increasing depth. Hereby, the elastic qualities can be varied as well. Naturally, it is possible to combine the embodiment of the FIG. 2d with those of FIGS. 2b and 2c.

With all embodiments, the condition is met wherein the spring pole, with its recesses or notches, on the one hand, provides a sufficient clamping force for the mounting of the overhead contact wire (4) and, on the other hand, has a very slight rigidity towards the flexible end. The first condition is achieved by the sections (12) of the full profile, which provide a sufficient clamping force. The second condition declares that the recesses must continue to become deeper. In the area of the free flexible end of the spring pole, the profile moment of inertia is very small and the main axis lies as deeply as possible near the plane of the overhead contact wire, so that during oscillations of the overhead contact wire, only very small relative forces occur between the overhead contact wire and the end of the spring pole. Thereby, in particular, breaks due to metal fatigue are prevented. The relatively flexible, suspended overhead contact wire oscillates, stimulated by the current collectors with a relatively high frequency, which lies clearly above the oscillation frequency of the rigid contact rail. For this reason, at the entry point of the overhead contact wire toward the spring pole, due to its good flexibility, the contact rail is in the position of oscillating at the same high frequency as the freely suspended overhead contact wire, at which point the spring pole damps these oscillations across its entire length.

Finally, at the end on the contact rail side of the spring pole (8), FIG. 2 also shows several bore holes (13) for the attachment of the initially mentioned butt straps.

Figure 3:
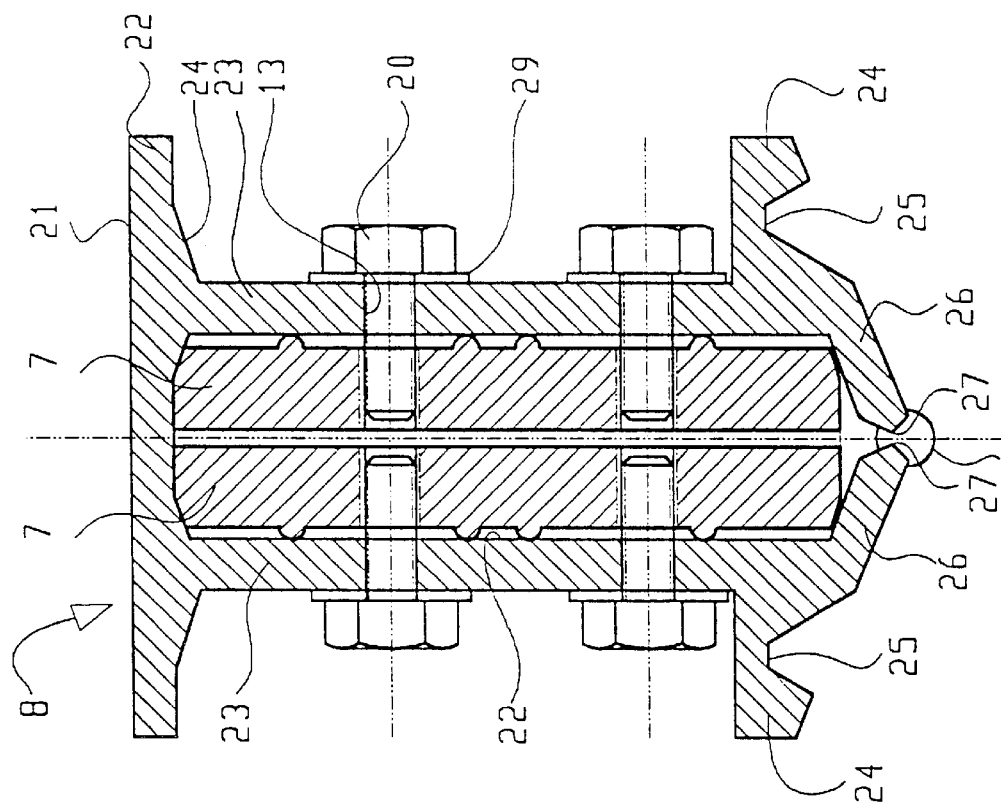
FIG. 3 shows a cross section through the spring pole in the area of the butt straps.

FIG. 3 shows a cross section of the spring pole (8) in the area of the butt straps (7). The profile of the spring pole (8) is mirror symmetrical with respect to the central axis and has a level, horizontal carrier (21) from which two flanks (23) protrude vertically, which at their respective lower ends open into a diagonally inwardly extending clamping flank (26) and in the direction toward the axis, respectively, having a clamping tip (27) for clamping the overhead contact wire (4) between them. The carrier (21), the two flanks (23), and the clamping flanks (26) form an essentially rectangular chamber (22) into which the butt straps (7) are placed and are attached by means of screws (20) that are passed through holes (13) in the arms (23). In the example of FIG. 3, the butt straps have threaded bore holes for receiving the screws (20). The butt straps (7) are provided on their exterior sides, which are assigned to the flanks (23), with longitudinal ribs (9) that establish a linear, defined contact surface on the interior side of the flanks (23) of the contact rail (3) and of the spring pole (8). In their cross section, these longitudinal ribs (9) have the shape of a cylinder segment. However, they may also be triangular. In the specific example, each butt strap (7) has four longitudinal ribs. Furthermore, the butt straps are provided above and below with tapered off areas (10). The transitional area between the carrier (21) and the arms (23) in the interior of the chamber (22) is also provided with an appropriate tapered off area (10'). Finally, the clamping flanks (26), which are appropriately tapered, extend toward the flanks (23). If the butt straps (7) are tightened by the screws (20), the appropriate tapered areas are pulled towards each other and the butt strap connects the contact rail profile sections in a form-locking manner, and hence in a manner that is extensively resistant to bending. The purpose of the longitudinal ribs (9) mounted on the butt straps is to transfer a defined contact surface for the transfer of the electrical current from one profile section (contact rail (3)) to another (spring pole (8)).

In FIG. 3 it can also be seen that the horizontal carrier (21) extends on both sides with arms (22) beyond the outer contour of the flanks, wherein a tapered area (24) is present in the transition area between the underside of the arms (22)

and the outside of the flanks (23). In the lower area of the flanks (23), near the transition towards the clamping flanks (26), arms protruding on both sides from the outside of the flanks (23) are provided whose underside has a trapezoidal recess (25) to which the clamping flanks (26) connect. As a whole, this profile is sufficiently rigid for the purpose of clamping in the overhead contact wire (4) and to secure it and to ensure, in the area of the rigid contact rail profile, the required bending resistance in the longitudinal direction. In the embodiment as a spring pole (8) with the recesses (11) (FIG. 2), however, it is flexible enough in the longitudinal direction in order to establish the flawless coupling between the flexible, suspended wire arrangement and the rigid contact rail.

Figure 5:
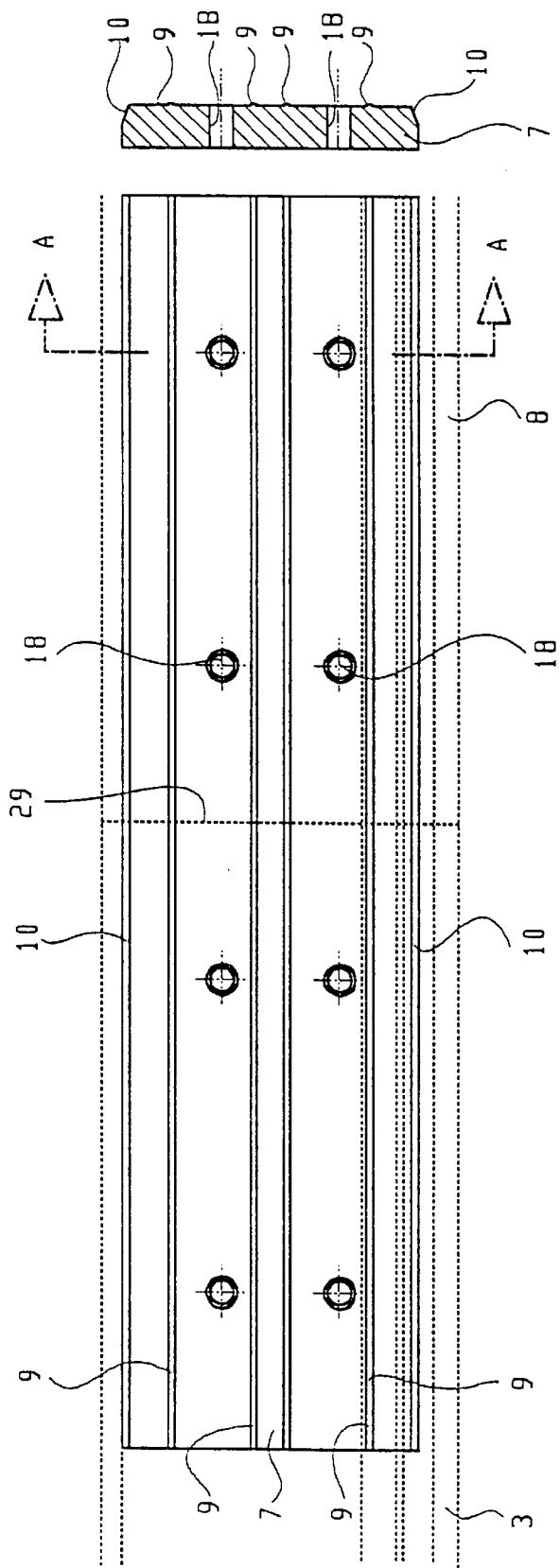
FIG. 5 shows a plane view of a connection point with butt straps, as well as again a reduced cross section of a butt strap.

FIG. 5 shows a side view of a butt strap (9) in the connection area between the rigid contact rail (3) and the spring pole (8), wherein its edge is shown by means of the broken line (29). The butt strap (7) is centrally placed into the profiles with respect to this line (29), so that its one half lies in the longitudinal direction in the rigid contact rail (3) and its other half lies in the spring pole (8). In these two halves, the butt strap has four threaded bore holes (18), each for the purpose of screwing in the screws (20) (FIG. 3).

Figure 4:
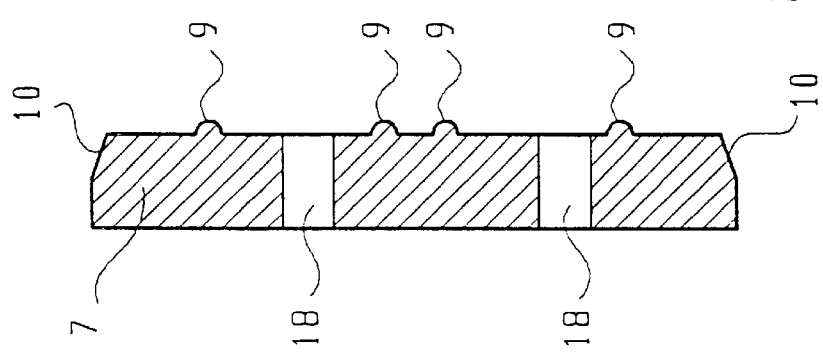
FIG. 4 shows a cross section of a butt strap.

In the right portion of FIG. 5—once again, similar to FIG. 4—a cross section along line A—A through the butt strap is shown. Finally, it can be gathered from FIG. 5 that the longitudinal ribs (9) extend across the entire length of the butt strap.

Figure 6:
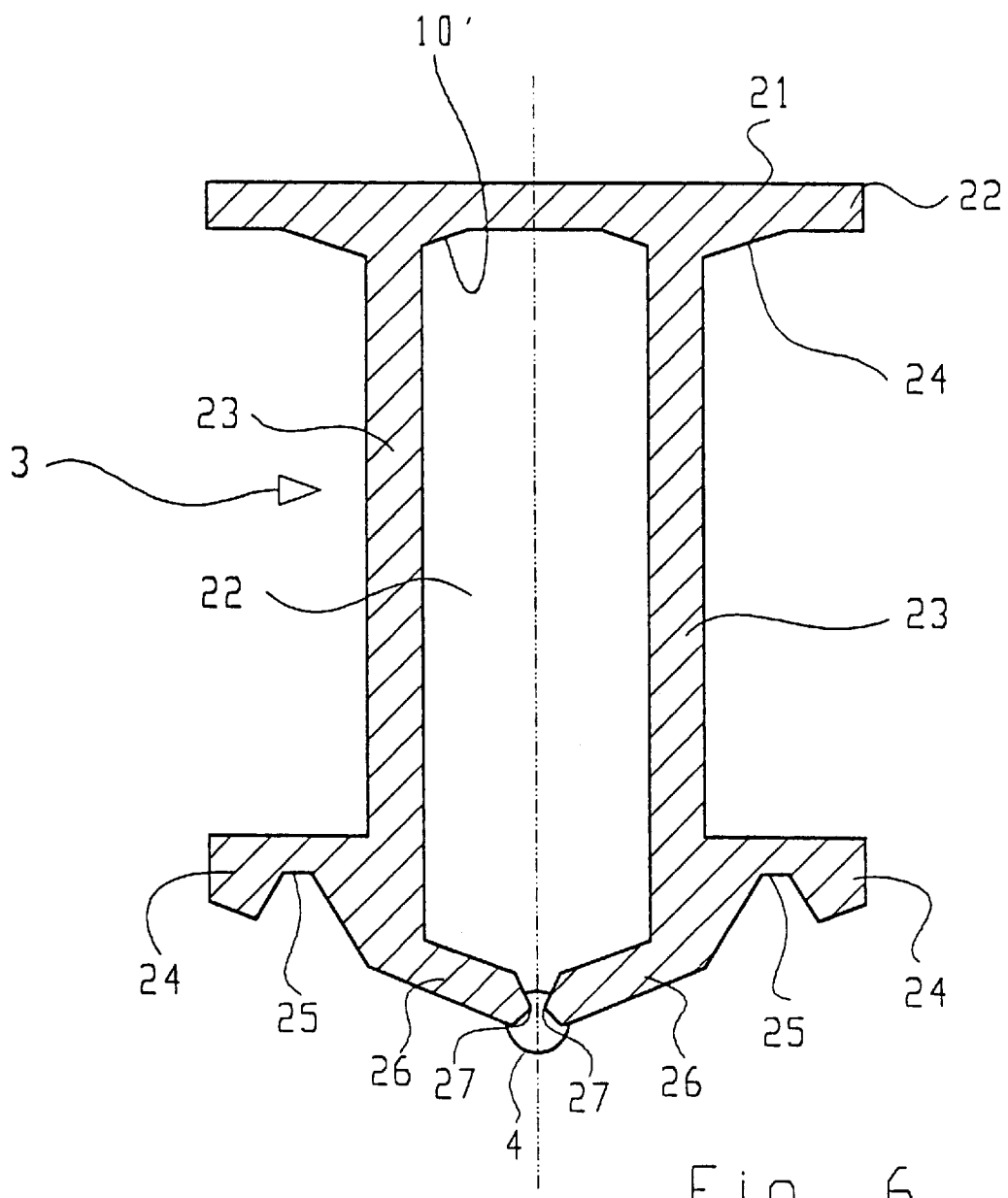
FIG. 6 shows a cross section of a rigid contact rail with overhead contact wire held by it.

FIG. 6 shows a cross section of the rigid contact rail (3) with clamped-in overhead contact wire (4). The contact rail entirely corresponds in its cross section to that of the spring pole (8) of FIG. 3, so that at the connection point (line 29 in FIG. 5) the two profiles (3 and 8) make a transition into each other with identical contours.

In summary, the invention provides an elastic transition from a flexible, suspended wire arrangement to a rigid contact rail by means of an elastic coupling whose resistance to bending gradually increases from the overhead contact wire entry toward the contact rail. The coupling is a series-connection, i.e., without lateral offset between the contact rail and the contact line. With the arrangement according to the invention, the spring pole can be simply adapted to the operational requirements and, in particular, to the required operating speeds of the vehicle, which is possible by adapting the recesses with respect to the form and distance, whereby the spring pole can be easily adapted to any operational requirement and, nonetheless, is easy to manufacture. The coupling area is adapted to the rail profile in a perfectly mechanical manner, in particular with respect to the resistance to bending and, by means of the contact surfaces, allows an uncritical, low-loss electrical coupling of the profiles with the tapered upper side and underside, as well as the longitudinal ribs.

I claim:

1. An apparatus for coupling a flexible contact line system and a rigid contact line system, said flexible and rigid contact line systems supporting an overhead contact wire for providing electrical power to electrically driven vehicles, said apparatus comprising:

an elongate spring pole positioned in a transitional area between the rigid contact line system and the flexible contact line system, said spring pole supporting the overhead contact wire in the transitional area and having a mechanical rigidity which varies in the longitudinal direction, said spring pole having an upper side and a lower side, said lower side of the spring pole supporting the overhead contact wire, and said spring pole including a plurality of recesses distributed in the longitudinal direction on the upper side of the spring pole generally opposite the overhead contact wire, each said recess being defined by elevated portions at both ends of the recess, and the elevated portions at the ends of said recesses having a substantially constant height.

2. The apparatus of claim 1 wherein the spring pole has one end connected to the rigid contact line system and another end connected to the flexible contact line system and wherein the recesses in the spring pole have depths which increase in longitudinal direction from the end of the spring pole connected to the rigid contact line system to the end of the spring pole connected to the flexible contact line system.

3. The apparatus of claim 2 wherein the depth of each recess is substantially uniform.

4. The apparatus of claim 2 wherein the depth of at least one of the recesses increases in the longitudinal direction from the end of the spring pole connected to the rigid contact line system to the end of the spring pole connected to the flexible contact line system.

5. The apparatus of claim 1 wherein the distance between the recesses decreases in the longitudinal direction from the end of the spring pole connected to the rigid contact line system to the end of the spring pole connected to the flexible contact line system.

6. The apparatus of claim 1 wherein the spring pole has an interior surface which defines a chamber at one of its ends and further comprising a butt strap for connecting the end of the spring pole to the rigid contact line system, said butt strap having a mating relationship with the chamber of the spring pole for mechanically connecting the spring pole to the rigid contact line system.

7. The apparatus of claim 6 wherein the butt strap includes tapered areas corresponding to tapered areas of the interior surface of the spring pole.

8. The apparatus of claim 6 wherein the butt strap has a plurality of longitudinal ribs for contacting the interior surface of the spring pole to electrically connect the spring pole to the rigid contact line system.

9. A method of coupling a flexible contact line system and a rigid contact line system, said flexible and rigid contact line systems supporting an overhead contact wire for providing electrical power to electrically driven vehicles, said method comprising the steps of:

positioning a flexible coupling between the rigid contact line system and the flexible contact line system, said step of positioning the flexible coupling including positioning the flexible coupling in a transitional area between the rigid contact line system and the flexible contact line system, said flexible coupling having a flexibility which increases continuously along the transitional area in the longitudinal direction from the rigid contact line system to the flexible contact line system, said flexible coupling comprising an elongate spring pole, said spring pole having an upper side and a lower side, said lower side of the spring pole supporting the current conductor;

supporting a current conductor with the flexible coupling; and distributing a plurality of recesses in the longitudinal direction on the upper side of the spring pole generally opposite the current conductor for varying the flexibility of the spring pole, each said recess being defined by elevated portions at both ends of the recess, and the elevated portions at the ends of said recesses having a substantially constant height.

10. The method of claim 9 further comprising the step of increasing the depths of the recesses in the longitudinal direction from the rigid contact line system to the flexible contact line system.

11. The method of claim 9 further comprising the step of decreasing the distance between the recesses in the longitudinal direction from the rigid contact line system to the flexible contact line system.

12. The method of claim 9 wherein the step of positioning the flexible coupling includes guiding the current conductor in series with respect to the rigid contact line system, the flexible coupling and the flexible contact line system.

* * * * *